United States Patent [19]

Dahn et al.

[11] Patent Number: 5,264,201
[45] Date of Patent: Nov. 23, 1993

[54] LITHIATED NICKEL DIOXIDE AND SECONDARY CELLS PREPARED THEREFROM

[75] Inventors: Jeffery R. Dahn, Surrey; Rosamaria Fong, Richmond; Ulrich Von Sacken, Port Coquitlam, all of Canada

[73] Assignee: Her Majesty the Queen in right of the Province of British Columbia, Canada

[21] Appl. No.: 556,754

[22] Filed: Jul. 23, 1990

[51] Int. Cl.$^5$ ................................. C01D 1/02
[52] U.S. Cl. ........................ 423/594; 429/209; 429/218; 429/223; 429/224
[58] Field of Search ............... 429/209, 218, 223, 224; 423/593, 594, 595, 596, 598, 599

[56] References Cited

U.S. PATENT DOCUMENTS

| | | | |
|---|---|---|---|
| 4,302,518 | 11/1981 | Goodenough et al. | 429/194 |
| 4,567,031 | 1/1986 | Riley | 423/593 |
| 4,959,282 | 9/1990 | Dahn et al. | 429/224 |
| 4,980,080 | 12/1990 | Lecerf et al. | 252/182 |
| 5,180,574 | 1/1993 | von Sacken | 423/594 |

FOREIGN PATENT DOCUMENTS

| | | |
|---|---|---|
| 243926 | 4/1987 | European Pat. Off. |
| 63-19761 | 1/1988 | Japan |
| 63-121260 | 5/1988 | Japan |

OTHER PUBLICATIONS

Gummow et al., *Mat. Res. Bull.*, 27(3), 327-37 (1992).
Dyer et al., *JACS*, 76, 1499-1503 (1954).
Bronger et al., *Z. Anorg. Allg. Chem.*, 333, 188-200 (1956).
Goodenough et al., *J. Phys. Chem. Solids*, 5, 107-16 (1958).
Goodenough et al., *J. App. Phys.*, 29(3), 382-3 (1958).
Fensham, *JACS*, 76, 969-71 (1954).

*Primary Examiner*—R. Bruce Breneman
*Attorney, Agent, or Firm*—Lerner, David, Littenberg, Krumholz & Mentlik

[57] ABSTRACT

Lithiated nickel dioxide cathode-active materials for electrochemical cells having the formula $Li_xNi_{2-x-y}M_yO_2$, with x being between about 0.8 and about 1.0, M being one or more metals selected from cobalt, iron, chromium, titanium, manganese and vanadium, and y being less than about 0.2, with the proviso that y is less than about 0.5 for cobalt, which material is substantially free of lithium hydroxide and lithium carbonate. The materials are prepared by providing a substantially homogeneous dry intermediate mixture of a starting material containing a nickel compound selected from nickel oxide, nickel hydroxide, and mixtures thereof, and optionally including one or more oxides or hydroxides of a transition metal selected from cobalt, iron, chromium, titanium, manganese and vanadium, together with between about a 10 and about a 25% stoichiometric excess of lithium hydroxide. The mixture is heat treated at a temperature above about 600° C. in an atmosphere substantially free of carbon dioxide and having a partial pressure ratio of oxygen to water vapor greater than about 15, after which any lithium hydroxide or lithium carbonate present in the mixture is removed. Thermally stable lithiated nickel dioxide having a BET surface area less than about 3.0 m$^2$/g, and is also disclosed, as well as electrochemical cells prepared from the disclosed lithiated nickel dioxides.

44 Claims, 1 Drawing Sheet

FIG. 1

LITHIATED NICKEL DIOXIDE AND SECONDARY CELLS PREPARED THEREFROM

BACKGROUND OF THE INVENTION

The present invention relates to the synthesis of lithiated nickel dioxide, substantially free of contaminants capable of decomposing electrochemically at cell voltages to produce gaseous decomposition products, particularly lithium hydroxide and lithium carbonate. Secondary electrochemical cells incorporating lithiated nickel dioxide as the cathode-active material are also disclosed, and in particular, lithium nickel oxide cathode active cells with carbonaceous counterelectrodes. Thermally stable lithiated nickel dioxide and methods of making same are also disclosed.

Electrochemical cells useful as electrical storage batteries usually incorporate a metal-containing anode and a cathode including an active material which can take up ions of the metal. An electrolyte incorporating ions of the metal is disposed in contact with the anode and the cathode. During discharge of the cell, metal ions leave the anode, enter the electrolyte and are taken up in the active material of the cathode, resulting in the release of electrical energy. Provided that the reaction between the metal ions and the cathode-active material is reversible, the process can be reversed by applying electrical energy to the cell. If such a reversible cathode-active material is provided in a cell having the appropriate physical configuration and an appropriate electrolyte, the cell can be recharged and reused. Rechargeable cells are commonly referred to in the battery art as "secondary" cells.

It has long been known that useful secondary cells can be made using a light alkaline metal such as sodium, potassium and particularly, lithium, as the source of the metal ions exchanged between the anode and cathode through the electrolyte. These metals are particularly useful in combination with a cathode-active material that is a sulfide or oxide of a transition metal, i.e., a metal capable of assuming plural different valence states. In the past, these alkaline metals such as lithium have been used in electrochemical cells in their pure metal state as the cell counterelectrode in combination with the transition metal cathode-active material. See, for example, Dampier, *J. Electrochem Soc.*, 121(5), 656–660 (1974). It is common knowledge that water reacts violently with alkaline metals such as sodium, potassium and lithium in their pure metal state. Not only must water be excluded from any component of a cell having an alkali metal counterelectrode, extreme care must be taken during cell assembly to avoid exposure of the counterelectrode metal material to ambient moisture and other sources of water.

Secondary lithium cell researchers have sought to develop a rechargeable lithium cell containing no metallic lithium. Cells have been developed using instead of a lithium metal counterelectrode, a intercalation host that operates near the potential of lithium, such as the material and cells incorporating same disclosed in presently co-pending U.S. Pat. Application Ser. No. 350,396 by Fong et al., filed May 11, 1989, which with the present application is commonly owned. The disclosure of which application is hereby incorporated herein by reference thereto.

Replacing lithium metal counterelectrodes with lithium intercalation host counterelectrodes removes the restrictions lithium metal counterelectrodes place upon cell design and choice of electrolytes and also the adverse effect lithium metal places upon cycling performance and safety in the finished cell. However, a source of lithium must still be supplied to the cell for exchange between the counterelectrode and cathode-active material through the electrolyte. This can be done by assembling cells with a sacrificial strip of lithium placed in electrical contact with the counterelectrode so that when electrolyte is added, the lithium is consumed by reacting with the intercalation host material of the counterelectrode. However, this wastes space and reduces cell capacity. Furthermore, while this method is advantageous to the extent that no lithium metal remains in the finished cell, the method still requires the handling of lithium metal during cell manufacture. Therefore, complicated measures are still required to prevent contact by the lithium metal with ambient moisture and other sources of water.

A preferred solution would be to use a cathode-active material which already contains the required lithium. However, many cathode-active host materials, such as $MoS_2$, are extremely reactive when intercalated with lithium, more so than lithium metal. Lithium metal at least can be exposed to dry air for several hours because it develops protective surface passivating layers. Reactive cathode-active intercalation hosts can only be handled under inert atmospheres. This would make manufacturing more complicated than the procedures presently used with lithium metal and prohibitively expensive.

The reactivity of lithiated cathode-active intercalation hosts, however, decreases as their voltage vs. $Li/Li^+$ increases, and at sufficiently high voltages they become air stable. Table I lists the free energy change in units of eV per Li atom, for lithium reacting with atmospheric gases, which can also be interpreted as the voltages (vs. $Li/Li^+$) above which lithium in a cathode-active intercalation host will not react with the respective gases and hence, be air stable. The information contained in this table indicates that in order to be air stable, a lithiated cathode-active intercalation host should have a voltage of at least about three volts vs. $Li/Li^+$. While this table indicates that for stability under carbon dioxide even higher voltages are required, at least about four volts vs. $Li/Li^+$, ambient concentrations of carbon dioxide are relatively low and some reaction with carbon dioxide can be tolerated. However, the higher voltages providing carbon dioxide stability are also desirable as a means of increasing the energy storage capacity of the cell.

TABLE I

| Free Energy Change (G) for Li reactions in air | |
|---|---|
| Reaction | G (eV/Li atom)* |
| $2Li(s) + CO_2(g) + \frac{1}{2}O_2(g) \rightarrow Li_2CO_3(s)$ | 3.82 |
| $2Li(s) + \frac{1}{2}O_2(g) \rightarrow Li_2O(s)$ | 2.91 |
| $Li(s) + H_2O \rightarrow LiOH(s) + \frac{1}{2}H_2(g)$ | 2.09 |
| $3Li(s) + \frac{1}{2}N_2(g) \rightarrow Li_3N(s)$ | 1.85 |

*for T = 25° C., and partial pressures of 1 atm.

There is, however, an upper voltage limit for potential lithiated cathode-active materials, namely the maximum cathode potential that can be sustained by the electrolyte and cell hardware. At present, the hardware at cathode potential is the limiting factor. Aluminum is the most corrosion-resistant and can sustain up to 4.2 volts vs. $Li/Li^+$. Therefore, candidate lithiated cathode-active intercalation host materials should have sufficient reversible capacity in the range of about 3 to about 4.2 volts.

Among the lithiated cathode-active materials within this voltage range is lithiated nickel dioxide. Capacity measurements over the voltage range of electrochemical secondary cells assembled with lithiated nickel dioxide indicate that this compound is a commercially feasible cathode-active material. Such a cathode-active material would be useful in both lithiumfree cells using a lithium intercalation host counterelectrode, as well as in conventional lithium cells.

Japanese published Patent Application 63-121,260 and European Patent Application Publication No. 243,926 disclose the preparation of lithiated nickel dioxide for use in lithium batteries by the solid state reaction of powdered nickel carbonates and/or oxides at temperatures in excess of 850° C. in air Japanese Published Patent Application 60-74,272 discloses a nickel hydroxide coating electrochemically oxidized in a lithium hydroxide solution to obtain a "lithium doped nickel oxide" that is then heat treated at 450° C. for one hour.

U.S. Pat. No. 4,567,031 discloses the preparation of lithiated nickel dioxide for use as a cathode-active material having the formula $Li_xNi_yO_z$ wherein x is between 0.1 and 1.1, y is between 1.1 and 0.1 and z is between 1.9 and 2.1, by co-crystallizing or co-precipitating a stoichiometric solution of an oxygen-containing lithium salt and an oxygen-containing nickel salt. The resulting mixed salt is calcined at 400°-500° C. in a stream of air or a stream of carbon monoxide and carbon dioxide. The low temperature calcination is disclosed as producing a high surface area powder. Japanese Published Patent Application 63-19,761 discloses the preparation of lithiated nickel dioxide by the anodic oxidation of nickel hydroxide in an aqueous solution of lithium hydroxide. The lithiated nickel hydroxide is then washed in hot water and heated at 200° C. for two hours to dry the material and drive off water to form the nickel dioxide. Lithiated nickel dioxide cathode-active material having the formula $Li_xNi_yO_2$, with x less than one and y about equal to one, is also disclosed in U.S. Pat. No. 4,302,518.

Published European Patent Application No. 345,707 discloses the preparation of lithiated nickel dioxide for use as a cathode-active material having the formula $Li_yNi_{2-y}O_2$ with $0.84 \leq y \leq 1.22$, made from lithium hydroxide and nickel oxide, pulverized and mixed in stoichiometric ratio and heated in air to a temperature between 600° and 800° C. An excess of lithium hydroxide is used to compensate for volatilization of this material at the heating temperature. The material is disclosed as being useful as a cathode-active material for secondary cells.

Electrochemical cells having lithiated nickel dioxide as the cathode-active material typically have poor cycling capacities In addition, lithiated nickel dioxide is thermally unstable when lithium is de-intercalated upon charging of the cell. The de-intercalation forms $Li_{1-x}NiO_2$. As x approaches 0.5, the nickel approaches an unstable 4+ valence, and the material releases oxygen when heated. If a charged cell is welded on the positive electrode and local heating of the $Li_{0.5}NiO_2$ occurs, oxygen can be liberated in the presence of the cell electrolyte solvent, which is driven above its flashpoint, resulting in an explosion.

Even when care is taken not to thermally release oxygen from the lithiated nickel dioxide charged cells, there is a tendency for gaseous products to accumulate with cycling, leading to a hazardous pressure buildup.

A lithiated nickel dioxide cathode-active material is needed having improved cycling capacity, thermal stability, and free from the evolution of gaseous products with cycling.

SUMMARY OF THE INVENTION

These needs are met by the present invention. It has now been discovered that lithiated nickel dioxide cathode-active material having the formula $Li_xNi_{2-x-y}M_yO_2$, with x being between about 0.8 and about 1.0, M being one or more metals selected from cobalt, iron, titanium, manganese, chromium and vanadium, and y being less than about 0.2, with the proviso that y is less than about 0.5 for cobalt, has improved cycling capacity over the existing art. The lithiated nickel dioxide can be obtained by heat treating a substantially homogeneous dry intermediate mixture of a starting material containing NiO, Ni(OH)$_2$ or mixtures thereof, and optionally including one or more oxides or hydroxides of a transition metal selected from cobalt, iron, titanium, manganese, chromium and vanadium, together with about a 10 to about a 25% stoichiometric excess of LiOH at a temperature above about 600° C. in an atmosphere substantially free of carbon dioxide and having a partial pressure ratio of oxygen to water vapor greater than about 15, and then removing from the heated mixture any LiOH or $Li_2CO_3$ present, so that the lithiated nickel dioxide is substantially free of LiOH and $Li_2CO_3$.

Because the improved cycling capacity of the lithiated nickel dioxide cathode-active material is maintained when up to about 20% of the nickel is replaced by one or more transition metals selected from cobalt, iron, chromium, titanium, manganese, and vanadium, and up to about 50% of the nickel can be replaced by cobalt, for purposes of this disclosure, all lithiated nickel dioxides, including those in which a portion of the nickel has been replaced by one or more transition metals are hereinafter referred to as lithiated nickel dioxides It has further been discovered that lithiated nickel dioxide having improved thermal stability over the existing art can be provided by heat treating the intermediate mixture at a temperature above about 800° C. so that lithiated nickel dioxide having a Brunauer-Emmett-Teller surface area of less than 2.0 m$^2$/g is obtained.

One aspect of the present invention provides a method of making a lithiated nickel dioxide cathode-active material substantially free of LiOH and $Li_2CO_3$, having a formula $Li_xNi_{2-x-y}M_yO_2$, with x being between about 0.8 and about 1.0, y being less than about 0.2 and M being one or more metals selected from cobalt, iron, chromium, titanium, manganese, and vanadium, with the proviso that y is less than about 0.5 for cobalt, which method includes the steps of providing a substantially homogeneous dry, intermediate mixture of a starting material containing Ni(OH)$_2$, NiO or mixtures thereof, and optionally including one or more transition metal hydroxides selected from the groups consisting of hydroxides and oxides of cobalt, iron, chromium and vanadium, together with about a 10 to about a 25% stoichiometric excess of LiOH, heating the mixture at a temperature above about 600° C. in an atmosphere substantially free of carbon-dioxide and having a partial pressure ratio of oxygen to water vapor greater than about 15, and removing from the mixture any LiOH or $Li_2CO_3$ present.

Another aspect of the present invention provides an improved lithiated nickel dioxide cathode-active material, substantially free of LiOH and $Li_2CO_3$, having the formula $Li_xNi_{2-x-y}M_yO_2$, wherein x is between about 0.8 and about 1.0, y is less than about 0.2 and M represents one or more transition metals selected from cobalt, iron, chromium and vanadium, with the proviso that y is less than about 0.5 for cobalt. Included within this aspect of the present invention is an improved lithiated nickel dioxide cathode-active material, substantially free of LiOH and $Li_2CO_3$, having the formula $Li_xNi_{2-x-y}M_yO_2$, wherein x, M and y are as described above.

While not being bound by any particular theory, it is believed that the exceptionally good cycling capacity of the lithiated nickel dioxide of the present invention is due in part to the atomic structure of the material. In $LiNiO_2$, metal atom layers of substantially pure lithium and substantially pure nickel alternate between layers of substantially pure oxygen. As x is decreased, nickel is incorporated into the lithium layers so that layers of substantially pure nickel alternate with layers of $Li_xNi_{1-x}$, with layers of substantially pure oxygen therebetween. Once x falls below about 0.6, all metal atom layers are substantially equivalent, consisting of $Li_xNi_{2-x}$.

The presence of nickel atoms in the lithium layer apparently affects the ability of lithium to be de-intercalated and the capacity of the material suffers. By maintaining x in $Li_xNi_{2-x-y}M_yO_2$ between about 0.8 and 1.0, improved cycling capacity over the existing art is obtained.

The foregoing aspects of the invention also incorporate the discovery that heating the intermediate mixture to about 600° C. volitalizes some of the LiOH, resulting in a lowering of x in $Li_xNi_{2-x-y}M_yO_2$, and consequently, a reduction in the capacity of the material. It was also discovered that such heating of the mixture in the presence of carbon dioxide forms $Li_2CO_3$, which is not cathode-active, and which scavenges lithium from the mixture, thereby lowering x in $Li_xNi_{2-x-y}M_yO_2$. It was further discovered that heating the mixture in pure water vapor causes lithiated nickel dioxide to decompose into LiOH and NiO. This discovery recognized that the presence of water vapor is unavoidable, because it is generated by the reaction of LiOH and NiO in the presence of $O_2$. However, by using about a 10% to about a 25% stoichiometric excess of LiOH, and heating the intermediate mixture in an atmosphere substantially free of carbon dioxide and having a partial pressure ratio of oxygen to water vapor is greater than about 15, the loss of lithium and lowering of x in $Li_xNi_{2-x-x-y}M_yO_2$ is minimized.

The foregoing aspects of the invention also incorporate the discovery that LiOH and $Li_2CO_3$, when present in lithiated nickel dioxide, decompose electrochemically at cell voltages. The LiOH generates oxygen, hydrogen and hydrogen peroxide, and the $Li_2CO_3$ generates carbon dioxide and oxygen. These predominantly gaseous products lead to pressure buildup in the cells. By minimizing the formation of LiOH and $Li_2CO_3$ and removing any LiOH and $Li_2CO_3$ present, the accumulation of gaseous products causing pressure buildup in cells is eliminated.

According to still yet another aspect of the present invention, a method is provided for making thermally stable lithiated nickel dioxide cathode-active material, having a BET surface area less than 3.0 $m^2/g$, which method includes the steps of providing a substantially homogeneous dry intermediate mixture including NiO, $Ni(OH)_2$ or mixtures thereof, and LiOH, and heating the mixture at a temperature above about 600° C. Another aspect of the present invention provides a lithiated nickel dioxide cathode active material having improved thermal stability, which lithiated nickel dioxide has a BET surface area of less than 3.0 $m^2/g$.

The foregoing aspect of the invention incorporates the discovery that as the surface area of lithiated nickel dioxide decreases, the thermal stability of the material increases, which surface area can be controlled by selection of the reaction temperature at which the intermediate mixture is heated. The surface area of the resulting product decreases as the temperature at which the mixture is heated increases. While not being bound by any particular theory, it is believed that the decreased surface area hinders the release of oxygen from the lithiated nickel dioxide so that longer heating times and higher temperatures are required to generate a quantity of oxygen sufficient to support combustion of the electrolyte solvent. At the temperature extremes and durations typically encountered, however, sufficient oxygen will not accumulate in the cell.

Further aspects of the present invention provide electrochemical cells incorporating the improved cathode-active materials of the present invention, made by the aforementioned methods. The electrochemical cells have a non-aqueous electrolyte of a lithium salt dissolved in an organic solvent. The counter electrode used with the cathode-active material can be either a lithium metal anode or a carbonaceous electrode capable of reversibly incorporating lithium from the cathode-active material. Preferred cells according to these aspects of the invention provide superior energy storage capabilities both when fresh and after repeated cycling, without an accumulation of gaseous products that lead to hazardous pressure buildup. The cells are also thermally stable and do not explode when subjected to temperature extremes such as welding of the cell casing.

The foregoing and other objects, features and advantages of the present invention will be more readily understood from the detailed description of the preferred embodiment set forth hereinbelow, taken in conjunction with the accompanying drawings.

DETAILED DESCRIPTION OF THE PREFERRED EMBODIMENTS:

A process according to one embodiment of the present invention provides for the preparation of $Li_xNi_{2-x-y}M_yO_2$, wherein x is between about 0.8 and about 1.0, M is one or more metals selected from iron, cobalt, chromium, titanium, manganese and vanadium, and y is less than about 0.2, with the proviso that y is less than about 0.5 for cobalt. This process utilizes as a starting material either nickel oxide, NiO, nickel hydroxide, $Ni(OH)_2$ or mixtures thereof. The starting material may also optionally include one or more oxides or hydroxides of transition metals such as iron, cobalt, chromium, titanium, manganese and vanadium. The starting material employed in the present process desirably is in fine particulate form, and most preferably has a mean particle size between about 1 micrometer and about 100 micrometers.

In the first step of the process, the starting material is contacted with a saturated aqueous solution of lithium hydroxide. Either oxides or hydroxides of the starting materials may be used, because the hydroxides decompose to form oxides when sufficiently heated. The contacting step desirably is performed by continuously mixing the lithium solution with the particulate starting material so as to form a slurry. The water is then evaporated from the slurry while continually agitating the slurry so as to provide a substantially homogeneous intermediate mixture of lithium hydroxide and the starting material. A preferred method is to spray dry the slurry by conventional spray-drying techniques.

Alternatively, the intermediate mixture can be formed by heating the slurry to a temperature above the boiling point of the aqueous slurry, more preferably under a reduced atmospheric pressure. As the water is evaporated, the boiling point of the slurry increases and the temperature to which the slurry is heated should be increased to maintain the temperature at the boiling point. Preferably, the temperature is increased until a temperature of about 150° C. is attained, which temperature should then be maintained. The evaporation and agitation steps are continued until the particles are substantially dried and each metal oxide or hydroxide particle receives a coating of lithium hydroxide. As used in this disclosure, the term "dry" means devoid of a distinct liquid phase. By contrast, the term "anhydrous" means free of either liquid or bound water. Because both lithium hydroxide and the metal oxides and hydroxides are heat-labile and generate water during heat-treatment, the dry intermediate mixture does not need to be anhydrous at this stage of the process.

To provide an intermediate of uniform composition, it is important that all of the metal oxide or hydroxide particles be exposed to substantially the same conditions of lithium concentration during the water evaporation step, and particularly at the end of this step. Therefore, it is important that agitation be continuous, up to the end of the evaporation step, i.e., up to at least the point where the particles are substantially dry. The simple mixing of dry lithium hydroxide and metal oxide or hydroxide powder or the inadequate, non-continuous mixing of the slurry while the water is evaporated results in an intermediate mixture that is insufficiently homogeneous.

The quantity of saturated lithium hydroxide solution and the metal oxides or hydroxides is selected so as to provide from about a 10 to about a 25% stoichiometric excess of lithium hydroxide over the metal oxides or hydroxides. The substantially homogeneous intermediate mixture of lithium hydroxide and the metal oxides or hydroxides are then heat-treated at an elevated temperature under a drying atmosphere, i.e., at atmosphere capable of taking up water vapor. The atmosphere used in the heat treatment step may be oxidizing or inert. Strongly reducing atmospheres adversely affect the product. Air is preferred for reasons of economy. The temperature employed in the heat-treatment step should be high enough to provide a reaction product of a substantially pure lithiated nickel dioxide substantially free of inclusions of unreacted lithium hydroxide or metal oxides or hydroxides. Accordingly, the temperature employed in the heat-treatment step should be above about 600° C., preferably above about 700° C., and most preferably above about 800° C.

The atmosphere used in this heat-treatment step should be substantially free of carbon dioxide, because this gas can react with lithium hydroxide to form lithium carbonate, which is not heat-labile under these conditions. Any lithium carbonate formed would reduce the value of x in $Li_xNi_{2-x-y}M_yO_2$ and remain as an impurity in the final product, where it would electrolytically decompose at cell voltages with cycling to produce oxygen and carbon dioxide, gaseous products that accumulate and lead to pressure buildup in the cells.

The lithium carbonate content of the lithiated nickel dioxide at the end of the heat-treatment step depends upon the partial pressure of carbon dioxide maintained in the atmosphere used in the heat treatment step, as well as during the mixing and drying of the slurry, because aqueous LiOH can be converted to $Li_2CO_3$ if the slurry is contacted with carbon dioxide. This partial pressure should be as low as practical so as to provide a substantially carbon dioxide-free atmosphere so that the lithiated nickel dioxide produced has a relatively low lithium carbonate content at the end of the heat-treatment step, and so that the reduction of x in $Li_xNi_{2-x-y}M_yO_2$ is minimized. Thus, the partial pressure of carbon dioxide in the atmosphere used in the heat treatment step is desirably below about 0.3 Torr, preferably below about 0.1 Torr and most preferably below about 0.05 Torr.

During the heat-treatment step, any moisture present in the substantially homogeneous intermediate mixture should be driven off. Additional water vapor is generated by the heat treatment of lithium hydroxide and nickel hydroxide or nickel oxide. This water should also be removed by the heat-treatment atmosphere. Any water remaining would react with the lithiated nickel dioxide, which would then decompose to form nickel oxide and lithium hydroxide; therefore, the atmosphere used in the heat-treatment step should be maintained substantially free of water vapor.

The lithium hydroxide contamination of the lithiated nickel dioxide is produced by an equilibrium reaction involving the reaction of the transition metal oxides or hydroxides in the presence of oxygen to form lithiated nickel dioxide and water vapor, which water vapor, if not removed, decomposes the lithiated nickel dioxide to re-form lithium hydroxide. This equilibrium reaction can be expressed as follows:

Because the equilibrium reaction forms lithium hydroxide in the presence of water vapor and reacts lithium hydroxide in the presence of oxygen to form lithiated nickel dioxide, whether the lithium hydroxide produced by the decomposition of lithiated nickel dioxide in the presence of water vapor will reform the lithiated nickel dioxide or remain as a contaminant depends upon the partial pressure ratio of oxygen to water vapor in the atmosphere used in the heat treatment step. As this ratio decreases, the amount of lithium hydroxide that remains increases and the value of x in $Li_xNi_{2-x-y}M_yO_2$ decreases. Any lithium hydroxide formed would remain as an impurity in the final product, where it would electrolytically decompose at cell voltages with cycling to produce oxygen, hydrogen and hydrogen peroxide, predominantly gaseous products that also accumulate and lead to pressure buildup in cells. Thus, the partial pressure ratio of oxygen to water vapor in the atmosphere used in the heat treating step is desirably above about 15, preferably above about 30, and most preferably above about 100.

The intermediate mixture is desirably held at the heat treatment temperature for about one-half hour and preferably for at least about one hour. As temperatures increase, reaction time may be decreased.

After the heat treatment step, any lithium carbonate formed or any lithium hydroxide remaining unreacted is removed from the lithiated nickel dioxide produced. Preferably, any lithium carbonate or lithium hydroxide present is removed by a controlled water extraction. The extraction of lithium hydroxide and lithium carbonate from $Li_xNi_{2-x-y}M_yO_2$ must be done with care, because hydrogen can replace lithium to make $Li_{x-z}H_zNi_{2-x-y}M_yO_2$. Typically, the lithium hydroxide and lithium carbonate are removed from the lithiated nickel dioxide by extraction with neutral water at a ratio of 300 g/l. The water and dissolved salts are removed by filtration and the filtrate is then dried at 600° C. in air to eliminate the incorporated hydrogen. For every mole of incorporated hydrogen eliminated, one-half mole of oxygen is also lost from the lithiated nickel dioxide. In addition, the lithium displaced by the hydrogen in the water extraction step is not replaced. Therefore, it is important that the amount of hydrogen incorporated into the lithiated nickel dioxide during the water extraction step be kept to a minimum by keeping the amount of water used to a minimum and by avoiding acidic conditions.

Alternatively, the filtrate can be dried by freeze-drying utilizing conventional freeze-drying methods and the freeze-dried $Li_{x-z}H_zNi_{2-x-y}M_yO_2$ used as a cathode active material. $Li_{x-z}H_zNi_{2-x-y}M_yO_2$ having z less than about 0.02 works well as a cathode active material.

The lithiated nickel dioxide obtained as a product of the within process has the formula $Li_xNi_{2-x-y}M_yO_2$, with x being between about 0.8 and 1.0, and preferably, between about 0.9 and 1.0. M is a transition metal selected from titanium, chromium, manganese, iron, cobalt, and vanadium, and y is less than about 0.2 and preferably less than about 0.1, with the proviso that y is less than about 0.5 for cobalt, and preferably less than about 0.25.

The lithiated nickel dioxide is substantially free of lithium hydroxide and lithium carbonate. The lithium hydroxide content of the product lithiated nickel dioxide is desirably below about 20,000 ppm by weight, preferably below about 10,000 ppm, and most preferably below about 5,000 ppm. The lithium carbonate content of the product lithiated nickel dioxide is desirably below about 20,000 ppm by weight, preferably below about 10,000 ppm, and most preferably below about 5,000 ppm.

The heat stability of lithiated nickel dioxide increases as the BET surface area of the material decreases. The BET surface area of lithiated nickel dioxides can be controlled by selection of the temperature at which the reactants are heat treated. As heat-treatment temperature is increased, the surface area of the material decreases and the heat stability increases. This occurs for both the lithiated nickel dioxide material of the present invention obtained as a product of the within process, as well as for other lithiated nickel dioxides, including those having differing stoichiometry, obtained from entirely different processes.

For the lithiated nickel dioxide of the present invention obtained as a product to the within process, material made at 600° C. has a BET surface area between about 5 and about 10 m$^2$/g. Material made at 800° C. has a BET surface area of less than 1 m$^2$/g. For the purpose of thermal stability, the lithiated nickel dioxide material of the present invention obtained as a product of the within process desirably has a BET surface area less than about 3 m$^2$/g. Preferably, the material has a BET surface area less than about 1 m$^2$/g. Even more preferably, the material has a BET surface area less than about 0.3 m$^2$/g.

Figure 1:
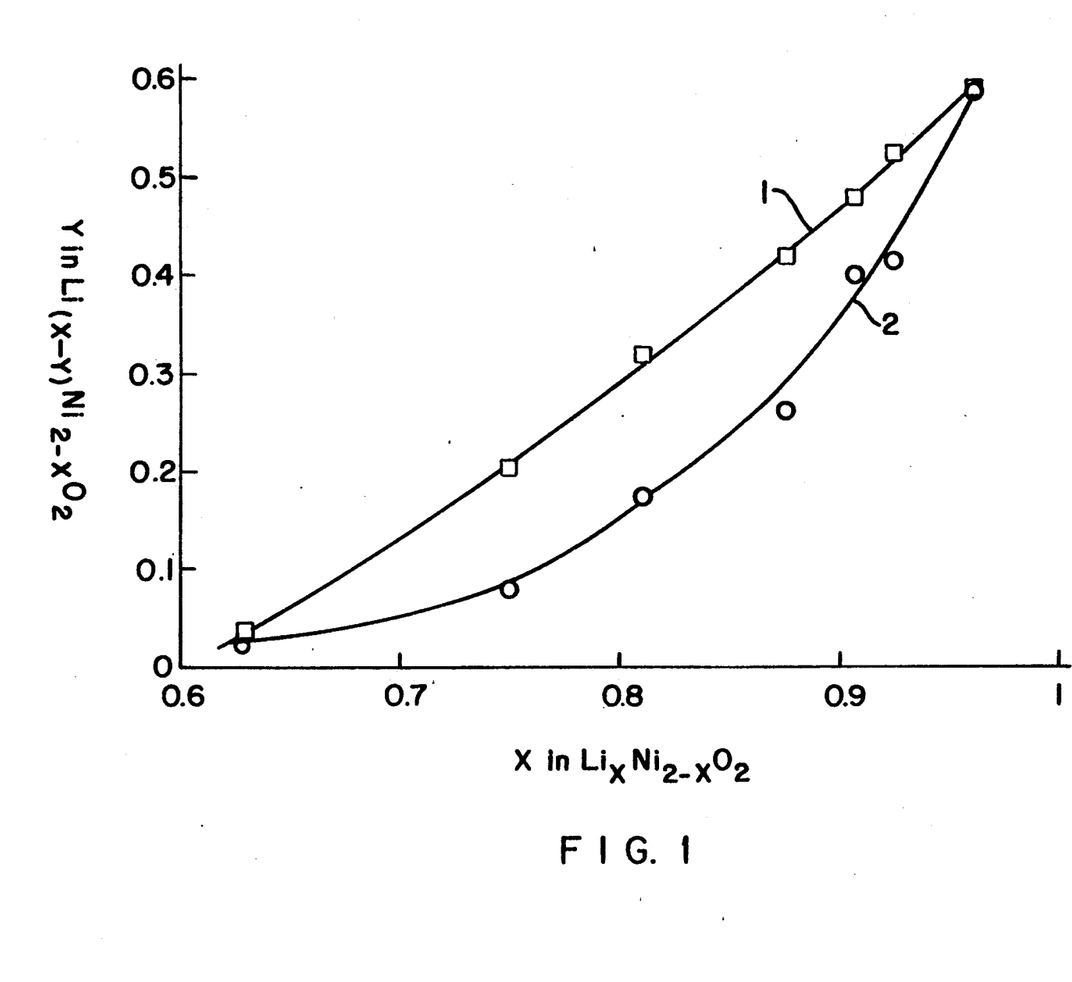
FIG. 1 depicts reversible capacity vs. x in $Li_xNi_{x-2}O_2$.

The relationship of cycling capacity to x in $Li_xNi_{2-x}O_2$ is shown in FIG. 1, which depicts the variation of reversible capacity, y, in $Li_{x-y}Ni_{2-x}O_2$ versus x. Curve 1 depicts cell capacity on the first charge to 4.0 V, and curve 2 depicts cell capacity on the first discharge to 2.0 V. As the value for x decreases, representing the incorporation of nickel in the lithium layers, the cell capacity suffers. The difference between the charging and discharging capacity of the cells also increases. This figure illustrates that cell capacity is maximized and the difference between charging and discharging capacity is minimized when x is between about 0.8 and about 1.0 in $Li_xNi_{2-x}O_2$.

The lithiated nickel dioxide of the present invention, obtained as a product of the within process can be fabricated into a cathode structure by the techniques commonly utilized with other, particulate cathode-active materials. Thus, the lithiated nickel dioxide of the present invention may be suspended in a volatile liquid carrier together with a polymeric binder such as polyethylene oxide, polytetrafluoroethylene or other fluropolymers or a polymer of ethylene propylene diene monomer, commonly referred to as EPDM. The suspension may be coated onto a suitable backing such as a metallic current collector foil, and the solvent may be evaporated so as to set the binder and provide a coherent layer of cathode-active material on the binder. Desirably, a chemically inert, particulate electrically conductive material such as carbon black is incorporated in the suspension and hence interspersed with the active material of the cathode structure in the conventional manner.

The cathode may be assembled in the conventional manner with a counterelectrode capable of intercalating lithium ions and with an electrolyte incorporating lithium ions to form a cell. Lithium metal counterelectrodes are suitable for use with the present invention. The preferred counterelectrode, however, is a particulate carbonaceous counter electrode, and may already have lithium metal intercalated therein, as disclosed by the above-cited co-pending U.S. Pat. Application No. 350,396. Preferably, the amount of lithium present in the cathode-active material is that quantity sufficient to saturate the counterelectrode upon charging of the cell. Thus, preferred cells according to the present invention will contain a cathode fabricated from the lithiated nickel dioxide of the present invention, and a carbonaceous counterelectrode, each capable of reversibly intercalating lithium ions and an electrolyte with which the cathode and counterelectrode are in mutual contact. Preferred materials for the carbonaceous counterelectrode include graphitic carbons, preferably poorly graphitic carbons. Preferred poorly graphitic carbons include coke, more preferably, petroleum coke.

Merely by way of example, the electrolyte may be a solution of a lithium salt in a non-aqueous liquid solvent. Suitable lithium salts include $LiAsF_6$, $LiPF_6$, $LiI$, $LiBr$, $LiBF_4$, $LiAlCl_4$, $LiCF_3CO_2$, $LiCF_3SO_3$ and mixtures thereof. $LiPF_6$, $LiI$ and $LiAsF_6$ and mixtures thereof are preferred, whereas $LiAsF_6$ is most preferred. Suitable electrolyte solvents include organic solvents such as propylene carbonate, ethylene carbonate and mixtures thereof with or without additional ingredients such as tetrahydrofuran, 2-methyl tetrahydrofuran, and dimethoxyethane (DME). When a lithium metal counterelectrode is used, the counterelectrode may be essentially pure lithium metal or may include an alloy of lithium with another metal such as aluminum, and the cell preferably incorporates means for applying pressure on the lithium counterelectrode at least during recharge, as disclosed in Canadian Patent No. 1,190,279.

The lithiated nickel oxide of the present invention thus provides an air-stable source of lithium for cells that have lithium-intercalable counterelectrodes instead of metallic lithium counterelectrodes. This simplifies cell design and manufacture because it is no longer necessary to design cells to accommodate temporary lithium counterelectrodes, nor is it necessary any longer to handle such electrodes.

The following, non-limiting examples set forth hereinbelow illustrate certain aspects of the invention:

EXAMPLE I 2,000 g $Ni(OH)_2$ powder having a mean particle size of about 10 microns is mixed with 5,000 ml of a saturated (approximately 5N) aqueous solution of LiOH at room temperature to form a slurry. The slurry is fed at a rate of approximately one $cm^3$ per second to a Niro atomizer spray drier, having an atomizing wheel spinning at 30,000 RPM. Atomized droplets of the slurry are ejected from the wheel into an airstream heated to a temperature of 250° C. The droplets are dried in the airstream forming fine homogeneous particles that are collected. The dry, substantially homogeneous intermediate mixture resulting from the spray drying is placed in a conventional oven heated to 800° C. and held at 800° C. for 1 hour. The heat-treated mixture is then removed from the oven and rinsed with 6,600 ml of neutral $H_2O$ and filtered to remove the $H_2O$ and any dissolved lithium salts. The filtrate is then heated to 600° C. for 4 hours.

The product is assembled into a spiral wound AA cell with a lithium metal anode and an electrolyte of 1M $LiAsF_6$ in a propylene carbonate/ethylene carbonate electrolyte solvent blend. The cell is tested by charging and discharging within a voltage range between about 3 and about 4.0 volts. The rate of cycling corresponds to full discharge in ten hours followed by full discharge in ten hours. For the first charge, the specific capacity of the cathode-active material was 0.14 ampere-hours per gram. After the second discharge, the specific capacity is maintained over many further charge/discharge cycles without pressure buildup. The specific capacity of prior art cells are generally in the range of 0.7 to 0.10 ampere hours per gram, as shown in FIG. 3 of U.S. Pat. No. 4,302,518. Cells incorporating the lithiated nickel dioxide of the present invention therefore demonstrate up to twice the reversible capacity of the existing art.

EXAMPLE II

Lithiated nickel dioxide cathode-active material was prepared as in Example 1, except that the dry, substantially homogeneous intermediate mixture is placed in a conventional oven and heated to 600° C. and held at this temperature for 4 hours. The BET surface areas of the lithiated nickel dioxides of both Examples I and II are measured using a Quantasorb BET system. The surface areas are 0.3 $m^2/g$. for the lithiated nickel dioxide of Example I, and 9 $m^2/g$. for the lithiated nickel dioxide of Example II. The lithiated nickel dioxide of Examples I and II are assembled into 1225 coin cells with a carbonaceous counterelectrode incorporating petroleum coke as the carbonaceous material and an electrolyte of 1M LiAsF in a propylene carbonate/ethylene carbonate electrolyte solvent blend. Cells containing both materials are charged to 3.9 volts.

One cell from each set is disassembled and the lithiated nickel dioxide recovered. The lithiated nickel dioxide recovered is rinsed with DME to remove the electrolyte, and then dried at room temperature under a vacuum. The value for y in $Li_{1-y}NiO_2$ is determined to be 0.48 for each sample. Half the cells containing the 9 $m^2/g$. BET surface area lithiated nickel dioxide are discharged to 2.0 volts and one cell is disassembled, with the lithiated nickel dioxide recovered, cleaned and analyzed as described above. The value for x in $Li_{1-y}NiO_2$ in this sample is determined to be 0.08.

In the remaining cells, spot welding pulses are applied to the 0.010" stainless steel case directly in contact with the cathode. When a 10 watt-sec. pulse is applied to the fully charged cells containing the 9 $m^2/g$. BET surface area lithiated nickel dioxide, the cells explode. When a 14 watt-sec. pulse is applied to the fully charged cells containing the 0.3 $m^2/g$. BET surface are lithiated nickel dioxide, no explosion occurs. Similarly, when a 15 watt-sec. pulse is applied to the discharged cells containing the 9.0 $m^2/g$. BET surface area lithiated nickel dioxide, again, no explosions occur. This example demonstrates that the lower surface area of the lithiated nickel dioxides of the present invention provide a thermally stable cathode-active material having improved safety over the larger surface area materials of the existing art. This Example also demonstrates that the thermal stability of the higher surface area material increases as the value for x in $Li_{1-x}NiO_2$ decreases upon discharge of the material, which shows that the material is destabilized by the de-intercalation of lithium.

The foregoing description of the preferred embodiment should be taken as illustrating, rather than as limiting the present invention as defined by the claims. Numerous variations and combinations of the features described above can be utilized without departing from the present invention.

We claim:

1. A method of making a lithiated nickel dioxide cathode-active material for an electrochemical cell, having a formula $Li_xNi_{2-x-y}M_yO_2$, wherein x is between about 0.8 and about 1.0, M is one or more metals selected from the group consisting of cobalt, iron, titanium, manganese, chromium and vanadium, and y is less than about 0.2, with the proviso that y is less than about 0.5 for cobalt, which material is substantially free of lithium hydroxide and lithium carbonate, said method comprising the steps of:

providing a substantially homogeneous dry intermediate mixture of a starting material comprising a nickel compound selected from the group consisting of nickel oxide, nickel hydroxide and mixtures thereof, and optionally including one or more oxides or hydroxides of a transition metal selected from the group consisting of cobalt, iron, titanium, manganese, chromium and vanadium, together with between about a 10% and about a 25% stoichiometric excess of lithium hydroxide; and heat treating said mixture at a temperature above about 600° C. in an atmosphere substantially free of carbon dioxide having a partial pressure ratio of oxygen to water vapor greater than about 15; and removing from said mixture any lithium hydroxide or lithium carbonate present.

2. A method as claimed in claim 1, wherein said step of providing said intermediate mixture includes the steps of contacting said starting material with a saturated aqueous solution of lithium hydroxide so as to form a slurry and evaporating water from said slurry.

3. A method as claimed in claim 2, wherein said evaporating step is continued at least until an intermediate mixture substantially devoid of free water is provided.

4. A method as claimed in claim 3, wherein said evaporating step comprises the step of spray-drying said slurry.

5. A method as claimed in claim 1, wherein said heat-treating step is conducted for at least one-half hour.

6. A method as claimed in claim 5, wherein said heat-treating step is conducted for at least one hour.

7. A method as claimed in claim 1, wherein said heat-treating step is conducted at a temperature between above about 700° C.

8. A method as claimed in claim 7, wherein said heat-treating step is conducted at a temperature above about 800° C.

9. A method as claimed in claim 1, wherein in said heat-treating step, said partial pressure of said carbon dioxide in said atmosphere is less than about 0.3 Torr.

10. A method as claimed in claim 9, wherein in said heat-treating step, said partial pressure of said carbon dioxide in said atmosphere is less than about 0.1 Torr.

11. A method as claimed in claim 10, wherein in said heat-treating step, said partial pressure of said carbon dioxide in said atmosphere is less than about 0.05 Torr.

12. A method as claimed in claim 1, wherein in said heat-treating step, said partial pressure ratio of oxygen to water vapor in said atmosphere is greater than about 15.

13. A method as claimed in claim 12, wherein in said heat-treating step, said partial pressure ratio of oxygen to water vapor in said atmosphere is greater than about 30.

14. A method as claimed in claim 13, wherein in said heat-treating step, said partial pressure ratio of oxygen to water vapor in said atmosphere is greater than about 100.

15. A method as claimed in claim 1, wherein said removing step comprises the steps of extracting said mixture with neutral water and recovering said mixture.

16. A method as claimed in claim 15, wherein said recovering step comprises filtering said water from said mixture.

17. A method as claimed in claim 16, wherein said removing step further comprises the step of drying said mixture after said filtering step.

18. A method as claimed in claim 17, wherein said drying step comprises drying said filtered mixture at 600° C. in air.

19. A method as claimed in claim 17, wherein said drying step comprises freeze-drying said filtered mixture.

20. A method as claimed in claim 15, wherein said mixture is extracted with one liter of water for every 300 g of said mixture.

21. A cathode-active material made by a process as claimed in claim 1.

22. An electrochemical cell comprising a cathode containing the cathode-active material as claimed in claim 21, a counter-electrode capable of intercalating lithium, and an electrolyte.

23. An electrochemical cell comprising an electrode comprising lithium, an electrolyte, and a cathode containing the cathode-active material as claimed in claim 21.

24. A lithiated nickel dioxide cathode-active material for an electrochemical cell, substantially free of lithium hydroxide or lithium carbonate, having a stoichiometric formula $Li_xNi_{2-x-y}M_yO_2$, wherein x is between about 0.80 and about 1.00, M is one or more metals selected from the group consisting of cobalt, iron, chromium, titanium, manganese and vanadium, and y is less than about 0.2, with the proviso that y is less than about 0.5 for cobalt.

25. The lithiated nickel dioxide of claim 24, having the stoichiometric formula $Li_xNi_{2-x}O_2$, wherein x is between about 0.80 and about 1.00.

26. The lithiated nickel dioxide of claim 25, wherein x is between about 0.90 and about 1.00.

27. The lithiated nickel dioxide of claim 24, having a lithium carbonate content less than about 20,000 ppm by weight.

28. The lithiated nickel dioxide of claim 27, having a lithium carbonate content less than about 10,000 ppm.

29. The lithiated nickel dioxide of claim 28, having a lithium carbonate content less than about 5,000 ppm.

30. The lithiated nickel dioxide of claim 24, having a lithium hydroxide content less than about 20,000 ppm by weight.

31. The lithiated nickel dioxide of claim 30, having a lithium hydroxide content less than about 10,000 ppm.

32. The lithiated nickel dioxide of claim 31, having a lithium hydroxide content less than about 5,000 ppm.

33. An electrochemical cell comprising a cathode containing the lithiated nickel dioxide cathode-active material as claimed in claim 24, an electrolyte, and a counter-electrode capable of intercalating lithium.

34. A lithiated nickel dioxide cathode-active material for an electrochemical cell having a BET surface area of less than about 3.0 $m^2/g$.

35. The lithiated nickel dioxide of claim 34, having a BET surface area of less than about 1.0 $m^2/g$.

36. The lithiated nickel dioxide of claim 35, having a BET surface area of less than about 0.3 $m^2/g$.

37. An electrochemical cell comprising a cathode containing the cathode-active material as claimed in claim 34, an electrolyte, and a counter-electrode capable of intercalating lithium.

38. The electrochemical cell of claim 22, or claim 33 or claim 37, wherein said counter-electrode capable of intercalating lithium, comprises graphitic carbon.

39. The electrochemical cell of claim 38, wherein said carbon is poorly graphitic.

40. The electrochemical cell of claim 39, wherein said poorly graphitic carbon comprises coke.

41. The electrochemical cell of claim 40, wherein said coke comprises petroleum coke.

42. An electrochemical cell comprising an electrode comprising lithium, an electrolyte and a cathode containing a cathode-active material as claimed in claim 24 or claim 34.

43. An electrochemical cell comprising a cathode containing a cathode-active material having a stoichiometric formula $Li_xNi_{2-x-y}M_yO_2$, wherein x is between about 0.8 and about 1.00, M is one or more metals selected from the group consisting of cobalt, iron, chromium, titanium, manganese and vanadium, and y is less than about 0.2, with the proviso that y is less than about 0.5 for cobalt, an electrolyte, and a counter-electrode capable of intercalating lithium, wherein said cathode-active material is substantially free of lithium hydroxide or lithium carbonate.

44. An electrochemical cell comprising a cathode containing a cathode-active material comprising lithiated nickel dioxide having a BET surface area less than about 3.0 $m^2/g.$, an electrolyte, and a counterelectrode capable of intercalating lithium.

* * * * *

UNITED STATES PATENT AND TRADEMARK OFFICE
CERTIFICATE OF CORRECTION

PATENT NO. : 5,264,201

DATED : November 23, 1993

INVENTOR(S) : Dahn et al.

It is certified that error appears in the above-identified patent and that said Letters Patent is hereby corrected as shown below:

Column 1, line 41, after "states" insert --.-- .

Column 1, line 58, "a intercalation host" should read --a lithium intercalation host--.

Column 2, line 22, "MoS2" should read --$MoS_2$--.

Column 3, line 17, after "in air" insert --.--.

Column 3, line 56, after "cling capacities" insert --.--.

Column 4, line 42, after "dioxides" insert --.--.

Column 5, line 53, "water vapor is" should read --water vapor that is--.

Column 5, lines 54-55, "$Li_x\text{-}Ni_{2-x-x-y}M_yO_2$" should read --$Li_xNi_{2-x-y}M_yO_2$--.

Column 7, line 58, "at atmosphere" should read --an atmosphere--.

UNITED STATES PATENT AND TRADEMARK OFFICE
CERTIFICATE OF CORRECTION

PATENT NO. : 5,264,201

DATED : November 23, 1993

INVENTOR(S) : Dahn et al.

It is certified that error appears in the above-identified patent and that said Letters Patent is hereby corrected as shown below:

Column 8, lines 51-53, should read

Column 8, lines 56-57 "reacts lithium" should read --reacts with lithium--.

Column 9, line 37, "$Li_x-_zH_zNi_2-_x-_yM\ _yO_2$" should read --$Li_x-_zH_zNi_2-_x-_yM_yO_2$--.

UNITED STATES PATENT AND TRADEMARK OFFICE
CERTIFICATE OF CORRECTION

PATENT NO. : 5,264,201

DATED : November 23, 1993

INVENTOR(S) : Dahn et al.

It is certified that error appears in the above-identified patent and that said Letters Patent is hereby corrected as shown below:

Column 10, line 37  "fluropolymers" should read --fluoropolymers--.

Column 13, line 31, in claim 7, line 2, delete "between".

Signed and Sealed this

Seventeenth Day of May, 1994

*Attest:*

BRUCE LEHMAN

*Attesting Officer*        *Commissioner of Patents and Trademarks*